(12) United States Patent
Mojana et al.

(10) Patent No.: US 7,815,781 B2
(45) Date of Patent: Oct. 19, 2010

(54) ELECTRODE FOR GAS EVOLUTION AND METHOD FOR ITS PRODUCTION

(75) Inventors: Corrado Mojana, I-Valmadrera (IT); Ulderico Nevosi, Milan (IT); Ruben Ornelas Jacobo, San Giuliano Milanese (IT); Paolo Rossi, Brugherio (IT)

(73) Assignee: De Nora Elettrodi S.p.A, Milan (IT)

( * ) Notice: Subject to any disclaimer, the term of this patent is extended or adjusted under 35 U.S.C. 154(b) by 937 days.

(21) Appl. No.: 10/514,186

(22) PCT Filed: May 23, 2003

(86) PCT No.: PCT/EP03/05424

§ 371 (c)(1),
(2), (4) Date: Nov. 10, 2004

(87) PCT Pub. No.: WO03/100135

PCT Pub. Date: Dec. 4, 2003

(65) Prior Publication Data

US 2005/0211553 A1    Sep. 29, 2005

(30) Foreign Application Priority Data

May 24, 2002 (IT) .......................... MI2002A1128

(51) Int. Cl.
*C25C 7/02* (2006.01)
*C02F 1/461* (2006.01)
*B05D 5/12* (2006.01)
*B05D 1/38* (2006.01)

(52) U.S. Cl. .............................. 204/290.12; 427/126.3; 427/419.3

(58) Field of Classification Search ....................... None
See application file for complete search history.

(56) References Cited

U.S. PATENT DOCUMENTS

| | | | | |
|---|---|---|---|---|
| 3,773,554 A | * | 11/1973 | Scrutton et al. | ........... 427/126.5 |
| 4,005,003 A | * | 1/1977 | Popplewell et al. | .... 204/290.09 |
| 5,098,546 A | | 3/1992 | Kawashima et al. | |
| 6,117,286 A | | 9/2000 | Shimamune et al. | |
| 6,368,489 B1 | * | 4/2002 | Hardee et al. | ................ 205/578 |

FOREIGN PATENT DOCUMENTS

| | | |
|---|---|---|
| EP | 0 475 814 | 3/1992 |
| EP | 0 531 264 | 3/1993 |

* cited by examiner

*Primary Examiner*—Harry D Wilkins, III
(74) *Attorney, Agent, or Firm*—Charles A. Muserlian

(57) ABSTRACT

The invention relates to the production of multilayer electrodes on valve metal substrates, through a method comprising the application in alternate cycles of a solution containing precursors of noble metals, and of a second solution containing transition metals capable of forming protective coatings. The resulting electrodes are useful in several applications, among which copper and other metal plating and the treatment of waste or tap water.

17 Claims, No Drawings

ELECTRODE FOR GAS EVOLUTION AND METHOD FOR ITS PRODUCTION

DESCRIPTION OF THE INVENTION

This application is a 371 of PCT/EP03/05424 filed May 23, 2003.

The present invention relates to a multilayer electrode for evolving gas in electrochemical processes, and to the method for the production thereof starting from a valve metal substrate. The electrode is employed in an assortment of electrochemical processes, among which copper electrometallurgy and the treatment of waste or tap water.

Several types of electrodes are known in the art providing the use of substrates with a conductive and inert metallic base coated with electrocatalytic layers constituting the site of electrochemical reactions involving gas evolution. A very common case is given for instance by anodes on titanium or other valve metal matrix coated with a layer of noble metals, in their elemental state or as oxides, employed in electrolysis processes with chlorine or oxygen evolution; another common case of oxygen evolving anodes is given by the various electrometallurgic applications (electrowinning, electrorefining, fast electroplating etc.) in aqueous electrolyte. Electrodes of such kind are disclosed for example in U.S. Pat. Nos. 3,428,544, 3,711,385, and many others. In many cases, the reaction environment is particularly aggressive, for instance due to the high acidity of the electrolyte, or to the presence of corrosive species such as fluoride ions, or again for the high current density at which the process is carried out. In these cases there is the risk that corrosion or passivation of the valve metal used as substrate may occur through the porosity or the possible defects of the catalytic coating. Although some valve metals, such as tantalum, present enhanced characteristics of resistance to this kind of phenomena, the use of more vulnerable metals, such as titanium, is preferred for reasons of workability and cost. To obviate at least in part to the action of the reaction environment, it is known the possibility of interposing a thin protective interlayer between substrate and catalytic coating. The protective interlayer is often of ceramic nature, and almost always based on transition metal oxides capable of forming compact surfaces across a very limited thickness, as their less than excellent electric conductivity imposes not exceeding with the thickness to avoid paying excessive resistive penalties. In the case of titanium, the use of mixed valve metal oxides, for example titanium and tantalum oxide, in the formulation of a suitable interlayer, is known from EP 0545869.

Although useful and sometimes necessary, the transition metal oxide-based thin interlayer may not be sufficient to impart the desired protection in the case of a few particularly critical applications. Some electrode embodiments have been therefore proposed in the course of the years, with or without a protective interlayer, provided with a dual coating, consisting of a proper catalytic layer, or activation layer, and of an external protective layer having suitable porosity, so as to allow the species involved in the electrochemical reactions to reach the catalytic sites of the underlying activation layer, without however an electrolyte renovation, effective enough to develop the corrosive action on the substrate to its maximum extent, taking place on the latter. This technique is not limited to the use in the field of anodes: U.S. Pat. No. 4,300,992 discloses for instance the use of a valve metal cathode for the production of chlorates comprising a coating consisting of an intermediate activation layer based on noble metals and of an outer protective layer based on catalytically inert metal oxides; FR 2797646 presents a very similar solution, except for the fact that the protective layer comprises, besides catalytically inert metal oxides (in this case, valve metal oxides) also a certain amount of noble metal, although to a lesser extent with respect to that contained in the intermediate activation layer. The electrolytic processes for the production of chlorates are nevertheless not the only field of application wherein the corrosion phenomena are so pronounced so as to suggest the employment of outer protective layers. WO 01/00905 discloses for example the use of an outer protective layer, which for example may comprise titanium, tin or tantalum oxides, destined to anodes for copper plating, whose activation layer normally comprises iridium and/or other platinum group metals. An outer protective layer presents a further important benefit, besides prolonging the lifetime of the anodes for copper plating and in general of the electrodes subjected to gas evolution: just in the case of electrometallurgic processes, the electrolytic baths commonly employed provide the introduction of organic substances, used for instance as brighteners/levellers or as carriers. The carrier, which regulates the diffusion of copper ions toward the surface, forms a thin film close to the surface itself without co-depositing, thereby controlling the growth of the metal crystals. The brightener/leveller acts instead at a microscopic level, flooding the areas acquiring a temporarily high potential and that would act thereby as preferential sites of deposition, forcing the metal to deposit elsewhere. The continuous migration of this additive while the local distribution of potential changes favours therefore the uniform metal deposition. The above described organic additives tend however to be destroyed when they come in contact with the oxygen evolving catalytic sites, thus requiring a continuous restoring, entailing a non negligible cost. The outer protective layer of suitable porosity makes the transportation of additives to the anodic catalytic sites difficult, thoroughly lessening the consumption thereof. Nevertheless, it could be verified that the electrode of WO 01/00905, although acceptable in terms of electrochemical potential notwithstanding the presence of the outer protective layer that partially masks the catalytic sites, does not offer at all an adequate solution in terms of operative lifetime: the protective layer applied externally to the activation layer according to the teaching of WO 01/00905 tends to be removed after some time, probably due to the eroding action exerted by the gas evolving on the underlying catalytic layer. In a short time (two to six months, for example, in the usual operative conditions of copper plating cells), large portions of the activation layer result to be uncovered and vulnerable to the electrolyte corrosive action, moreover going back to acting as sites of destruction of the organic additives.

Another example of application wherein the use of a multilayer electrode for gas evolution having an outer protective layer and an activation layer interposed between the latter and the substrate turns out to be useful is given by the anodes for waste water treatment. In such field, widespread is the use of ceramic anodes, for instance based on tin dioxide, optionally doped with other elements capable of imparting the required electric conductivity and of regulating the electrochemical potential thereof, which evolve oxygen at high potential in the water under treatment (until 2 V referred to the Normal Hydrogen Electrode). The species developed by the anodic reaction such as atomic oxygen and ozone achieve in this case a good destruction of organic residues, algae, bacteria and other contaminant and/or scaling biological forms. As the ceramic anodes are so expensive and, mainly, as they have mechanical characteristics which strongly limit their geometry and size, alternative electrodes have been proposed, for instance in U.S. Pat. No. 5,364,509, made of a valve metal substrate coated with somewhat modified tin oxide, with an intermediate layer of higher electric conductivity and an outer protective layer also useful to regulate the working potential. The duration of this type of electrode is however extremely penalised by the scarce mutual adhesion of the different layers.

According to the present invention, it is provided a method for the preparation of a multilayer electrode for gas evolution, comprising a valve metal substrate, an intermediate activation layer and an outer protection layer, overcoming the drawbacks of the prior art and presenting largely extended operating lifetimes.

According to a further aspect, it is provided a method for the preparation of an anode for oxygen evolution in processes of copper or other metal plating overcoming the drawbacks of the prior art and presenting largely extended operating lifetimes and reduced consumption of organic additives.

According to a further aspect, it is provided a method for the preparation of an anode for oxygen evolution in waste or tap water treatment presenting high oxygen evolution potentials at low current density for extended lifetimes.

The method of the invention comprises the preparation of a first solution containing the precursor of one or more noble metals and/or relative oxides, the preparation of a second solution containing the precursor of at least one oxide of a non noble transition metal, the application in two or more alternate cycles of the two solutions in one or more coats per cycle, with the execution of an intermediate thermal treatment after each coat for the conversion of the relative precursors, and lastly the execution of a final thermal treatment.

In one preferred embodiment, the first solution contains also the precursor of at least one oxide of non noble transition metal, at a-substantially lower concentration than in the second solution.

In another preferred embodiment, the second solution contains also the precursor of one or more noble metals and/or relative oxides, at a substantially lower concentration than in the first solution.

In another preferred embodiment, both solutions comprise the precursor of at least one oxide of non noble transition metal and the precursor of one or more noble metals and/or relative oxides, and the ratio of the concentrations of the precursors is substantially different in the two solutions.

The electrode of the invention is obtained starting from a valve metal substrate; for reasons of cost and workability, titanium is the preferred valve metal, but others such as tantalum, niobium or zirconium can be employed depending from the needs. A protective interlayer may be deposited in direct contact with the substrate, as known in the art. In case titanium electrodes are used in an acidic environment, for instance, the preferred interlayer is a mixture of valve metal oxides, typically titanium and tantalum, as disclosed in EP 0545869. On the substrate, provided or not with an interlayer, are then formed the activation layer and the protective layer. Instead of depositing the two complete layers one after the other, with the associated problems of mutual adhesion evidenced in the prior art, it has been surprisingly noticed that a much more controlled way of depositing two distinct layers is that of forming two solutions, one rich in noble metal, the other rich in transition metals capable of forming protective oxides, and to apply them in alternate cycles, each consisting of one or more coats, executing a thermal treatment after each coat which serves to convert the precursors in the two solutions to the final components.

It has been surprisingly noticed that, although the two solution are applied in an alternate fashion, even in a high number of cycles, the process leads to the formation of an inner layer rich in noble metal and relatively poor in non noble transition metal, of generally constant composition; and of an outer layer progressively richer in non noble metal, wherein such structure turns out to be provided with high mechanical stability.

Without wishing the present invention to be bound in any way to a particular theory, it may be presumed that the noble metal-rich solution, applied according to the method of the invention, present cracks and fractures which are filled by the second solution, mechanically reinforcing it. It may be as well presumed that diffusion/migration phenomena following the final thermal treatment contribute to form the peculiar concentration profile detectable by microanalysis. The outer protective layer results in any case extremely well anchored to the inner activation layer, as the result of a gradual change in the composition toward the surface, without steep discontinuities.

In order to improve the compatibility between interlayer and activation layer, it may be convenient to insert a second protective interlayer, very rich in noble metal, between the two. For this purpose, the method of the invention provides the application to the valve metal substrate, in this sequence:

of the thin interlayer precursor, for instance based on titanium and tantalum oxides of a few coats of the noble metal-rich solution of at least two alternate cycles of the two solutions, one rich in noble metal, the other rich in non noble transition metal capable of forming protective oxides, each cycle comprising the deposition of one or more coats of the corresponding solution.

The application of the solution may be effected in different ways, for instance by rolling, or by spraying optionally assisted by an electrostatic field. After each coat, it is necessary to carry out a thermal treatment at a temperature comprised between 300 and 700° C. to effect the conversion of the precursors in the final components.

As the non noble transition metals capable of forming protective oxides, titanium and tantalum mixtures and tin are preferred; the latter is particularly preferred in the case of electrodes destined to work in plating baths containing fluorides, an impurity which is present in many metallurgic applications (galvanic chromium plating, copper and zinc primary electrometallurgy) capable of establishing serious corrosion and deactivation phenomena on the electrodes starting from contamination levels of a few parts per million. Tin is also the typical element for protection of anodes destined to work at high potential in the treatment of waste or tap water; in this case, it is typically mixed with antimony to increase its conductivity and catalytic properties. A solution of precursors of transition metals capable of forming protective oxides for anodes destined to waste water treatment contains, in one preferred embodiment, tin, antimony and optionally a conductor selected from copper and/or iridium; in this case tin typically amounts to at least 90% of the overall metal expressed as weight percentage, whilst the overall content of copper and/or iridium is comprised between 0.1 and 2%.

As the noble metals, almost all the elements of the platinum group, especially iridium, platinum itself, and moreover ruthenium, palladium and rhodium are employed; a typical case of noble metal-rich solution, also containing non noble transition metal, can contain tantalum and iridium, for instance as chlorides, preferably in a Ta:Ir ratio comprised between 20:80 and 45:55 by weight. The typical noble metal loading in the activation layer ranges between 4 and 30 g/m$^2$, except in the case of electrodes for waste or tap water treatment wherein the high potentials required impose a much lower noble metal content, typically comprised between 0.5 and 3 g/m$^2$.

EXAMPLE 1

A 1.5 mm thick titanium sheet grade 1 according to ASTM B 265, with a surface of 35 cm×35 cm, was subjected to a degreasing treatment with acetone followed by corundum sandblasting, annealing at 570° C. and etching in sulphuric acid. The sheet was then painted with two coats of a solution of tantalum and titanium chlorides in a 1:4 weight ratio referred to the metals, and subjected to a ten minute thermal treatment at 550° C. after each coat, giving rise to an oxide film corresponding to 1 g/m² expressed as the sum of tantalum plus titanium.

4 coats were then applied of an acidic solution containing tantalum and iridium chlorides in a 35:65 weight ratio referred to the metals, so as to apply about 1 g/m² of metal per coat. After each coat, a ten minute thermal treatment at 550° C. was carried out.

The same acidic solution of Ta and Ir chlorides previously applied and a second acidic solution containing 55 g/l of $TiCl_3$ in hydrochloric acid were then applied in 6 alternate cycles of 2 coats each, with a ten minute thermal treatment at 550° C. after each coat.

A final thermal treatment at 550° C. for two hours was carried out. The sheet was cut in half and subjected to linear scan with an EDAX probe in the direction of its thickness. The analysis evidenced the formation of an about 4 micrometers thick intermediate layer of generally constant composition, with a (Ta+Ti):Ir weight ratio of about 1:1, and of an outer layer about 2 micrometers thick with a (Ta+Ti):Ir weight ratio gradually increasing from 1:1 to 3:1 proceeding towards the surface.

EXAMPLE 2

A 1.5 mm thick titanium sheet grade 1 according to ASTM B 265, with a surface of 35 cm×35 cm, was subjected to a degreasing treatment with acetone followed by corundum sandblasting, annealing at 570° C. and etching in sulphuric acid. The sheet was then painted with two coats of a solution of tantalum and titanium chlorides in a 1:4 weight ratio referred to the metals, and subjected to a ten minute thermal treatment at 550° C. after each coat, giving rise to an oxide film corresponding to 1 g/m² expressed as the sum of tantalum plus titanium.

4 coats were then applied of an acidic solution containing tantalum and iridium chlorides, in a 35:65 weight ratio referred to the metals, so as to apply about 1 g/m² of metal per coat. After each coat, a ten minute thermal treatment at 550° C. was carried out.

The same acidic solution of Ta and Ir chlorides previously applied and a second acidic solution containing 50 g/l of $TaCl_5$ in hydrochloric acid were then applied in 10 alternate cycles of 2 coats each, with a ten minute thermal treatment at 550° C. after each coat.

A final thermal treatment at 550° C. for two hours was carried out. The sheet was cut in half and subjected to linear scan with an EDAX probe in the direction of its thickness. The analysis evidenced the formation of an about 6 micrometers thick intermediate layer of generally constant composition, with a Ta:Ir weight ratio of about 1:1, and of an outer layer about 2 micrometers thick with a Ta:Ir weight ratio gradually increasing from 1:1 to 2.5:1 proceeding towards the surface.

COUNTEREXAMPLE 1

A 1.5 mm thick titanium sheet grade 1 according to ASTM B 265, with a surface of 35 cm×35 cm, was subjected to a degreasing treatment with acetone followed by corundum sandblasting, annealing at 570° C. and etching in sulphuric acid. The sheet was then painted with two coats of a solution of tantalum and titanium chlorides in a 1:4 weight ratio referred to the metals, and subjected to a ten minute thermal treatment at 550° C. after each coat, giving rise to an oxide film corresponding to 1 g/m² expressed as the sum of tantalum plus titanium.

14 coats of an acidic solution containing titanium and iridium chlorides in a 35:65 weight ratio referred to the metals were then applied, so as to apply about 1 g/m² of overall metal (iridium plus tantalum) per each coat. A ten minute thermal treatment at 550° C. was carried out after each coat.

4 coats of an acidic solution containing 55 g/l of $TaCl_5$ in hydrochloric acid were finally applied, with a ten minute thermal treatment at 550° C. after each coat. After these applications, the overall amount of deposited metal, expressed as the sum of tantalum plus iridium, resulted to be about 15 g/m².

A final thermal treatment at 550° C. for two hours was carried out. The sheet was cut in half and subjected to linear scan with an EDAX probe in the direction of its thickness. The analysis evidenced the formation of an about 5 micrometers thick intermediate layer of variable composition, with a Ta:Ir weight ratio gradually increasing from 1:2 to 2:1 proceeding towards the surface, and of an iridium-free 2 micrometers thick outer layer.

COUNTEREXAMPLE 2

A 1.5 mm thick titanium sheet grade 1 according to ASTM B 265, with a surface of 35 cm×35 cm, was subjected to a degreasing treatment with acetone followed by corundum sandblasting, annealing at 570° C. and etching in sulphuric acid. The sheet was then painted with two coats of a solution of tantalum and titanium chlorides in a 1:4 weight ratio referred to the metals, and subjected to a ten minute thermal treatment at 550° C. after each coat, giving rise to an oxide film corresponding to 1 g/m² expressed as the sum of tantalum plus titanium.

24 coats were then applied of an acidic solution containing tantalum and iridium chlorides in a 1:1 weight ratio referred to the metals, so as to apply about 1 g/m² of overall metal per each coat. A ten minute thermal treatment at 550° C. was carried out after each coat. A final thermal treatment at 550° C. for two hours was carried out. The sheet was cut in half and subjected to linear scan with an EDAX probe in the direction of its thickness. The analysis evidenced the formation of an about 6 micrometers thick intermediate layer of generally constant composition, with a Ta:Ir weight ratio of about 1:1, and of an about 2 micrometers thick outer layer with a Ta:Ir ratio gradually increasing from 1:1 to 2.5:1 proceeding towards the surface.

EXAMPLE 3

The four samples of the previous examples and counterexamples were subjected to an accelerated life-test consisting in operating them. as oxygen evolving anodes at high current density in an aggressive electrolyte, measuring the time of deactivation expressed as number of working hours necessary to make the electrode overvoltage rise above a predetermined value. The duration value obtained in this type of test, wherein the process conditions are extremely exasperated with respect to those of the industrial practice, allows extrapolating with some reliability the duration in the real processes they are destined to, as known to the experts of the field.

The lifetime test employed consists of using the sample as oxygen evolving anode in a test cell which effects the electrolysis of a sulphuric acid aqueous solution with a concentration of 150 g/l at 60° C., at an anodic current density of 30 kA/m². As the counterelectrode, a hydrogen evolving zirconium cathode of large surface is employed, whose potential is substantially constant in the course of the test. The initial cell voltage in these conditions is about 4.5 V; the anode is considered as deactivated when such cell voltage reaches the conventional value of 8 V.

The samples of examples 1 and 2 showed a duration of 2250 and 2400 hours, that of counterexample 1 a duration of 1815 hours; in the case of counterexample 2, a higher initial cell voltage was detected (4.7 V), with a duration of 990 hours.

Without wishing the present invention to be bound to any particular theory, it may be presumed that the latter sample, although almost indistinguishable from that of example 2 by means of an EDAX analysis, has in fact an insufficient electronic conductivity, as it consists of a mixture of scarcely conductive tantalum oxide containing a dispersion of conductive iridium oxide; with a 1:1 by weight composition, the amount of iridium oxide particles is insufficient to grant the layer an optimal electric conduction: the iridium oxide particles are dispersed in a nearly homogeneous fashion and are therefore separated and not able to form continuous rows. Conversely, the electrodes of examples 1 and 2 likely consist of fractured but electrically continuous iridium oxide layers, whose porosity is filled with tantalum oxide performing its protective function without altering the local conduction bridges; although the EDAX has not a sufficient resolution to distinguish the two phases, they are less interpenetrated and the functioning of the electrode is by no means jeopardised, allowing a cell voltage equivalent to that of the electrode of counterexample 1 and not much higher than what obtainable with an electrode not provided with an outer protective layer.

EXAMPLE 4

The samples of examples 1 and 2 and of counterexample 1 were subjected to a test in industrial operating conditions, in a process of copper plating. An aqueous electrolyte was used containing 140 g/l $CuSO_4$ and 200 g/l $H_2SO_4$, with a total of 100 ppm of chlorides and with the addition of 50 cc/l of a leveller commercialised as SBH by the Shipley Company, L.L.C., Marlborough, Mass./USA. The copper cathode was shaped as a thin sheet, and the plating process was carried out at a current density of 3 kA/m². The neutralisation of the acidity due to the anodic evolution of oxygen and the restoring of the deposited copper were effected by addition of cuprous oxide. During the first three months of operation, the electrodes of examples 1 and 2 required a reintegration of 650 cc of levellers per 100 liters of solution, versus 800 cc per 100 liters of the electrode of counterexample 1. After three months, the reintegration of leveller required by the electrode of counterexample 1 increased by 100%, while that necessary with the electrodes of examples 1 and 2 remained substantially constant.

EXAMPLE 5

Two 1.5 mm thick titanium sheets grade 1 according to ASTM B 265, with a surface of 35 cm×35 cm, were subjected to a degreasing treatment with acetone followed by corundum sandblasting, annealing at 570° C. and etching in sulphuric acid. Both sheets were then painted with two coats of a solution of tantalum and titanium chlorides in a 1:4 weight ratio referred to the metals, and subjected to a ten minute thermal treatment at 550° C. after each coat, giving rise to an oxide film corresponding to 1 g/m² expressed as the sum of tantalum plus titanium.

On the first sheet, 20 coats of an acidic solution containing tantalum and iridium chlorides in a 35:65 weight ratio referred to the metals were then applied, so as to deposit about 1 g/m² of metal overall (iridium plus tantalum) per coat. A ten minute thermal treatment at 530° C. was carried out after each coat, then a final thermal treatment at 550° C. for two hours. On the second sheet were applied, in 10 alternate cycles of 2 coats each and with a thermal treatment at 530° C. after each coat, the same acidic solution of Ta and Ir chlorides applied on the first sheet, and a second acidic solution containing 20 g/l of tin oxalate in nitric solution, corresponding to a final deposit of 14 g/m² of metal overall. A final thermal treatment of two hours at 550° C. was then carried out. The second sheet was cut in half and subjected to linear scan with an EDAX probe in the direction of its thickness. The analysis evidenced the formation of an about 6 micrometers thick intermediate layer of generally constant composition, with a (Ta+Sn):Ir ratio of about 1:1, and of an about 2 micrometers thick outer layer with a (Ta+Ir):Ir ratio gradually. increasing from 1:1 to 4:1 proceeding towards the surface.

The two electrodes so obtained were subjected to the same life-test of example 3, the difference being that 5 ppm of fluorides were added to the sulphuric electrolyte.

The electrode obtained from the first sheet, activated with tantalum and iridium, showed a duration of 275 hours; the electrode obtained from the second sheet, containing tin, evidenced a duration of 1320 hours.

COUNTEREXAMPLE 3

A 1.5 mm thick titanium sheet grade 1 according to ASTM B 265, with a surface of 35 cm×35 cm, was subjected to a degreasing treatment with acetone followed by corundum sandblasting, annealing at 570° C. and etching in sulphuric acid. The sheet was then painted with two coats of a solution of tantalum and titanium chlorides in a 1:4 weight ratio referred to the metals, and subjected to a ten minute thermal treatment at 550° C. after each coat, giving rise to an oxide film corresponding to 1 g/m² expressed as the sum of tantalum plus titanium.

10 coats were then applied on the sheet of an acidic solution containing tantalum and iridium chlorides in a 35:65 weight ratio referred to the metals, so as to deposit about 1 g/m² overall of metal per each coat. A ten minute thermal treatment at 530° C. was carried out after each coat.

4 coats were subsequently applied, with thermal treatment at 530° C. after each coat, of the same nitric solution of tin oxalate of the previous example, corresponding to a final deposit of 14 g/m² of metal overall.

A final thermal treatment at 550° C. was then carried out for two hours.

The sheet was cut in half and subjected to linear scan with an EDAX probe in the direction of its thickness. The analysis evidenced the formation of an about 6 micrometers thick intermediate layer of variable composition, with a Ta:Ir ratio gradually increasing from 1:2 to 2:1 proceeding towards the surface, and of a 2 micrometers thick outer layer fundamentally consisting of tin dioxide.

The electrode was subjected to the same test of example 5, following which a duration of 400 hours was detected.

EXAMPLE 6

Two 1.5 mm thick titanium sheets grade 1 according to ASTM B 265, with a surface of 35 cm×35 cm, were subjected to a degreasing treatment with acetone followed by corundum sandblasting, annealing at 570° C. and etching in sulphuric add. Both sheets were then painted with two coats of a solution of tantalum and titanium chlorides in a 1:4 weight ratio referred to the metals, and subjected to a ten minute thermal treatment at 550° C. after each coat, giving rise to an oxide film corresponding to 1 g/m² expressed as the sum of tantalum plus titanium.

On the first sheet were then applied, in 10 alternate cycles of 2 coats each and with a thermal treatment at 530° C. after each coat, a very dilute acidic solution containing tantalum and iridium chlorides in a 35:65 weight ratio referred to the metals, so as to deposit about 0.1 g/m² of metal per each coat, and a second acidic solution containing 22 g/l overall of tin oxalate, antimony chloride and iridium (IV) chloride in nitric solution, in a weight ratio of Sn 93.5%, Sb 4.5%, Ir 2%.

The second sheet was painted likewise, except that the second acidic solution contained fin oxalate, antimony chloride and cupric nitrate hexahydrate in nitric solution, in a weight ratio of Sn 93.5%, Sb 4.5%, Cu 2%. A final thermal treatment for two hours at 550° C. was then carried out.

The sheets were cut in half and subjected to linear scan with an EDAX probe in the direction of their thickness. The analysis evidenced: in the former case, the formation of an about 5 micrometers thick intermediate layer of generally constant composition, with an iridium content of 2% expressed as weight percentage, and of an about 3 micrometers thick outer layer with progressively decreasing iridium content up to a 0.5% value in correspondence of the surface, in the latter case, an equivalent situation, but with an iridium content in the outer layer decreased at trace level in correspondence of the surface.

The two sheets were characterised as electrodes for the potabilisation of tap water at ambient temperature, against a zirconium cathode. The anodic potential, measured in 0.1 N sulphuric add at ambient temperature at a current density of 100 A/m², resulted to be 1.85 V for the electrode obtained from the former sheet, 2.10 V for the electrode obtained from the latter Although those which are believed to be the best embodiments of the present invention have been described, it will be evident to the experts in the art that other variations and modifications may be introduced thereto without departing from the spirit and scope of the same.

The invention claimed is:

1. A method for applying an electrocatalytic coating to a valve metal electrode substrate, the coating comprising an inner layer and an outer layer, said inner and outer layer containing a noble metal and a non-noble metal, the composition of said outer layer being progressively richer in non-noble metal toward the surface, wherein the method comprises the steps of:
   preparation of a first solution and of a second solution, both containing the precursor of at least one oxide of a non noble transition metal and the precursor of at least one noble metal or oxide thereof
   application of said first solution in at least one coat to the valve metal substrate, with the execution of an intermediate thermal treatment between one coat and the next
   subsequent alternate application of said first and second solution in at least two alternate cycles per each solution, each of said cycles consisting of at least one coat, with the execution of an intermediate thermal treatment between one coat and the next
   wherein said first and second solutions contain said precursor of said at least one oxide of a non noble transition metal and said precursor of at least one noble metal or oxide thereof in a different ratio, said ratio being lower for the first solution directly applied to the valve metal substrate in the first of said application cycles.

2. The method of claim 1 wherein said non noble transition metal is selected from the group consisting of titanium, tantalum and tin, and said at least one noble metal comprises iridium.

3. The method of claim 1 wherein at least one thin protective interlayer comprising a mixture of oxides of non noble transition metals is applied to said valve metal substrate prior to the application of said intermediate activation layer and of said outer protective layer.

4. The method of claim 3 wherein said at least one protective interlayer comprises a mixture of titanium and tantalum oxides.

5. The method of claim 4 wherein following said at least one protective interlayer comprising a mixture of titanium and tantalum oxides, also a second protective interlayer comprising at least one noble metal is applied.

6. The method of claim 5 wherein said second protective interlayer is applied starting from said first solution containing the precursor of said at least one noble metal or oxide thereof.

7. The anode of claim 5 wherein said application of said first and second solution in alternate cycles is effected in an overall number of cycles comprised between 6 and 10.

8. An anode obtained by the method of claim 5, wherein said first solution contains tantalum and iridium in a weight ratio between 20:80 and 45:55, and said second solution contains tin in a weight ratio higher than 90%, antimony and optionally copper or iridium in a weight ratio comprised between 0.1 and 2%.

9. The anode of claim 8, wherein said first solution is an acidic solution of said tantalum and iridium, and the second solution is a nitric acid solution of tin oxalate and antimony chloride, optionally containing iridium chloride or copper nitrate.

10. The anode of claim 8 wherein said application of said first and second solution in alternate cycles is carried out in an overall number of cycles comprised between 4 and 10.

11. A cell for waste water treatment comprising the anode of claim 8.

12. An anode obtained by the method of claim 4, wherein said first solution contains tantalum and iridium in a weight ratio comprised between 20:80 and 45:55, and said second solution contains at least one metal selected between titanium, tantalum, tin and antimony.

13. The anode of claim 12 wherein said first solution and said second solution are acidic solutions and said second solution contains at least one component selected from the group of chlorides and oxalates of said tantalum, titanium, tin and antimony.

14. A metal plating cell comprising the anode of claim 12.

15. The cell of claim 14 wherein said metal to be plated is selected between copper, chromium and zinc.

16. The cell of claim 14, wherein the plating bath comprises organic additives and/or fluorides.

17. A method for the production of an electrode for gas evolution in electrochemical processes on a valve metal substrate, having an intermediate activation layer and an outer protection layer, both containing at least one oxide of a non noble transition metal and at least one noble metal or oxide thereof, the ratio between non noble transition metal and noble metal being defined and distinct in the two activation and protection layers, comprising:

preparation of a first solution containing the precursor of said at least one noble metal or oxide thereof and the precursor of said at least one oxide of a non-noble transition metal preparation of a second solution containing the precursor of said at least one oxide of a non noble transition metal application of said first and second solutions in at least two alternate cycles for each solution, each of said cycles consisting of at least one coat of said first solution, to said valve metal substrate followed by at least one coat of the second solution, with execution of an intermediate thermal treatment between one coat and the next and execution of a final thermal treatment at a temperature between 300 and 700° C., wherein said defined and distinct ratio between non noble transition metal and noble metal is higher in the outer protective layer than in the intermediate activation layer.

* * * * *